M. O. DAVIS.
CRATE.
APPLICATION FILED APR. 15, 1909.

944,077.

Patented Dec. 21, 1909.

WITNESSES:
C. P. Wright Jr.
S. S. Burket.

INVENTOR.
M. O. Davis
BY A. S. Pattison
ATTORNEY.

UNITED STATES PATENT OFFICE.

MORDECAI O. DAVIS, OF DULUTH, MINNESOTA, ASSIGNOR OF ONE-HALF TO CLARENCE E. PEASLEE, OF DULUTH, MINNESOTA.

CRATE.

944,077.  Specification of Letters Patent.  Patented Dec. 21, 1909.

Application filed April 15, 1909. Serial No. 490,087.

*To all whom it may concern:*

Be it known that I, MORDECAI O. DAVIS, citizen of the United States, residing at Duluth, in the county of St. Louis and State of Minnesota, have invented certain new and useful Improvements in Crates, of which the following is a specification, reference being had therein to the accompanying drawing.

My invention relates to improvements in crates, and pertains more particularly to what are known as nesting crates.

The object of my invention is to provide a more simple, cheap and effective crate whereby a number of baskets with their handles attached may be more readily crated for shipment in the smallest possible space.

Figure 1:
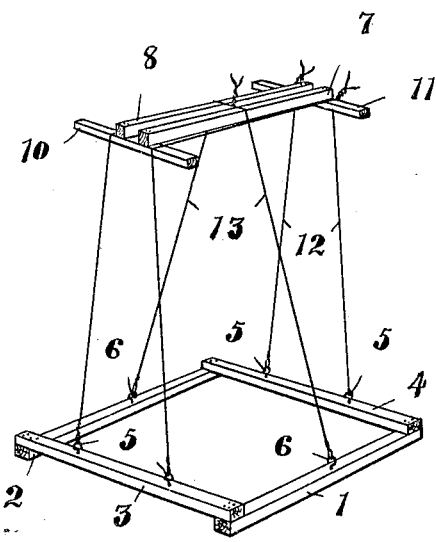
Figure 2:
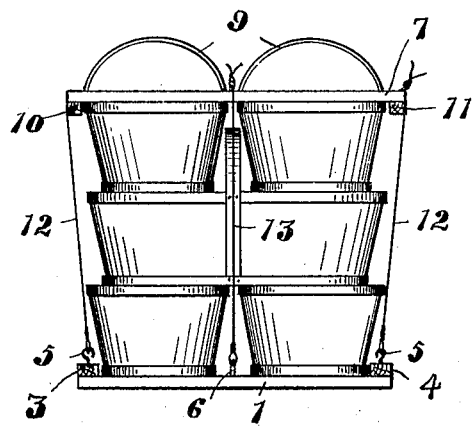

In the accompanying drawing: Figure 1 is a perspective view of my improved crate assembled without the baskets therein. Fig. 2 is a side elevation of the crate filled with baskets ready for shipment.

Referring now to the drawings, 1 and 2 represent the bed-pieces of the base of the crate and upon which the lower row of baskets rest, and 3 and 4 are cross-pieces securing the bed pieces together and these cross-pieces are spaced a distance apart equal to the width of the base of two baskets, as clearly shown in Fig. 2. These cross-pieces 3 and 4, as shown prevent the baskets from moving sidewise from the bed or base pieces 1 and 2. The cross-pieces are provided with two eyes 5 and the bed or base pieces are each provided with a single eye 6.

The top of the crate is formed of two strips 7 and 8, which are spaced a distance apart sufficient to allow the handles 9 to pass between the same. The cross-pieces 10 and 11 secure the strips 7 and 8 together and these cross-pieces are spaced a distance apart equal to the width of the upper end of two baskets, as shown in Fig. 2. While I have shown the crate of a width equal to the width of two baskets, it will be understood that it can be made of different sizes, but it has to be made of a size equal to an even number of baskets in order to have them properly nestle together.

The lower row of baskets, as shown in Fig. 1, rests upon the bed-pieces 1 and 2. The next row of baskets rests upon the lower row at right angles to the lower row, that is one basket on each side of the handles of the lower row. This as will be readily seen prevents the lower row of baskets from moving longitudinally and thus each succeeding pair of baskets locks the previous row in position. When the desired number of baskets are placed together, that is, there must be an uneven number of rows, the top of the crate is applied with the handles of the top row of baskets extending between the strips 7 and 8 and the cross-pieces 10 and 11 extending along the sides of the upper row of baskets.

Secured within eyes 5 are wires 12, which extend upwardly over the cross-pieces 10 and 11 and clamp the top tightly upon the bottom row of baskets and are secured together as shown. Secured to the eyes 6 in the bed-pieces are wires 13, which extend up over the strips 10 and 11 and these wires hold the wires 12 against outward movement upon the cross-pieces. The wires 13 extend between the baskets of the odd rows and engage the sides of the baskets of the even rows whereby the baskets are held against movement by said wires and the interlocking of the handles. By lengthening the wires it will be seen that the number of baskets can be readily increased, but as before stated, it is necessary to leave an odd number of rows.

Having thus described my invention, what I claim and desire to secure by Letters Patent is:

1. A crate, comprising a bottom, a top having a slot adapted to allow the handles of the baskets to pass therethrough and a flexible connection between the top and bottom and adapted to clamp the baskets between the same and engage the sides of the baskets.

2. A crate, comprising a bottom, a top having a slot adapted to allow the handles of the baskets to pass therethrough, and a flexible connection between the top and bottom and wires secured to the bottom and passing over the top and twisted together.

3. A crate comprising a bottom composed of bed plates and cross plates upon which the baskets are adapted to rest, said bed and top composed of two strips spaced a distance apart to allow the handle of the basket to pass between the same, cross pieces connecting the ends of the strips, wires secured to the bottom and extending over the strips and the cross pieces and twisted together and clamping the baskets between the top and bottom.

4. A crate, comprising a bottom composed of bed plates upon which the basket rests, cross plates connecting the ends of the bed plates, a top composed of two strips spaced a distance apart to allow the handle of the basket to pass between the same, cross pieces connecting the ends of the strips and extending a distance on either side, wires secured to the cross plates of the bottom and extending over the cross pieces of the top on the outside of the strips and secured together and wires secured to the bed plates and extending over the strips of the top on the outside of the before mentioned wires.

5. A crate, comprising a bottom, a top having a central longitudinal opening to allow the handles of the baskets to pass therethrough, and wires secured to the bottom and extending over the top and hoisted together and clamping the baskets between the top and bottom.

6. A crate comprising a bottom, a top having a central longitudinal opening to allow the handles of the baskets to pass therethrough, and wires secured to the bottom and extending over the top on each side of the slot, and wires secured to the bottom and extending transversely across the top.

7. A crate comprising a bottom upon which the baskets are adapted to rest, a top composed of two strips spaced a distance apart to allow the handles of the baskets to pass between the same, cross-pieces connecting the ends of the strips, and wires secured to the bottom and extending over the strips and the cross-pieces and twisted together and clamping the baskets between the top and bottom.

In testimony whereof I affix my signature in presence of two witnesses.

MORDECAI O. DAVIS.

Witnesses:
C. E. PEASLEE,
J. S. HERRELL.